Patented Jan. 23, 1940

2,188,286

UNITED STATES PATENT OFFICE 2,188,286

LAMINATED RUBBER GASKET

James A. Merrill, Akron, Ohio, assignor to Wingfoot Corporation, Wilmington, Del., a corporation of Delaware No Drawing. Application March 12, 1937,
Serial No. 130,512

2 Claims. (Cl. 288—34)

This invention relates to a laminated article comprising rubber and rubber hydrochloride. The laminated product has unique properties due in part to the rubber and in part to the rubber hydrochloride. It may be employed for a variety of uses. Rubber hydrochloride compositions have been described in the Calvert Patent No. 1,989,632. The rubber hydrochloride of this invention may be prepared in the manner there described or in any other suitable way. Where the product is to be exposed to light it is desirable to incorporate in the rubber hydrochloride a photochemical inhibitor such as hexamethylene tetramine or other inhibitor mentioned in the Calvert patent. It is not essential that such inhibitors be incorporated with the rubber hydrochloride. The rubber hydrochloride may be colored by dyestuffs and may contain plasticizers such as paraffin, butyl stearate, etc. although such plasticizers are not an essential of the invention.

Rubber hydrochloride films are extensible but on stretching they retract quite slowly. By laminating a rubber hydrochloride film with rubber it is found that the rubber hydrochloride assumes substantially the elasticity of rubber and on stretching it quickly retracts with the stretched rubber and when firmly bound to the rubber there is no separation of the rubber and rubber hydrochloride. The laminated product has a variety of uses for which neither the rubber hydrochloride nor the rubber alone can be employed. For example, the laminated product may be cut to form a gasket, and when the gasket is formed from rubber coated on both sides with rubber hydrochloride it may be employed in packaging oils and greases, etc. and particularly foodstuffs, because the rubber hydrochloride is not attacked by oils or greases or swelled by solvents as rubber is and does not impart taste and flavor to the foodstuffs as rubber does.

The rubber may be an ordinary sheet of cured rubber or it may be a latex rubber which may or may not be vulcanized and compounded with rubber compounding ingredients. The rubber and rubber hydrochloride may be separately formed into sheets which in the case of rubber hydrochloride may be a very thin sheet, such as a sheet .001 inch thick or thicker. The two sheets thus separately formed may be united by a suitable adhesive which bonds the two together and prevents separation on stretching or other deformation. As an alternative method the two sheets may be united by rolling the rubber hydrochloride on to the rubber by a hot roller. A solvent for the rubber or the rubber hydrochloride or a solvent for both the rubber and the rubber hydrochloride may be used as an adhesive. The solvent may contain ingredients such as rubber or rubber hydrochloride, etc.

Another way of forming the laminated product comprises spreading a film of rubber hydrochloride onto the rubber or dipping the rubber into a rubber hydrochloride cement. A suitable cement of the rubber hydrochloride may be prepared as described in the Calvert patent. On evaporation of the solvent of the cement the rubber will be found to be coated with a sheet of the rubber hydrochloride.

The laminated article of this invention may, for example, be prepared by spreading a 60% latex on a glass surface and drying. A cement of rubber hydrochloride which may, for example, be prepared as described in the Calvert patent (with or without photochemical inhibitors, plasticizers, dyestuffs, etc.) may then be spread over the surface of the rubber and dried. A laminated sheet for the preparation of gaskets may be formed by removing the coated rubber from the glass surface and then coating the reverse side with a rubber hydrochloride cement such as that previously employed. For gasket material a sheet of rubber sandwiched between rubber hydrochloride sheets may thus be obtained which is both flexible and transparent and a sheet .025" in thickness has sufficient resilience and cushioning properties to form a valuable gasket material. The laminated product thus formed, whether coated on one or both sides, may be put to various uses. It will be found that on stretching, the rubber hydrochloride is highly elastic and retracts immediately and that the elasticity of the laminated article is, for all practical purposes the same as the elasticity of rubber alone.

What I claim is:

1. A gasket composed of rubber sandwiched between rubber hydrochloride sheets, said rubber and hydrochloride sheets being secured directly to one another.

2. A gasket composed of rubber with a coating of rubber hydrochloride united directly to the rubber of the gasket.

JAMES A. MERRILL.

CERTIFICATE OF CORRECTION.

Patent No. 2,188,286.   January 23, 1940.

JAMES A. MERRILL.

It is hereby certified that error appears in the printed specification of the above numbered patent requiring correction as follows: Second column, line 46, claim 1, after "and" insert rubber; and that the said Letters Patent should be read with this correction therein that the same may conform to the record of the case in the Patent Office.

Signed and sealed this 2nd day of April, A. D. 1940.

(Seal)
Henry Van Arsdale,
Acting Commissioner of Patents.